United States Patent [19]

Pernice et al.

[11] Patent Number: 5,514,743
[45] Date of Patent: May 7, 1996

[54] OLEFIN OR STYRENE (CO)POLYMER, TRAIZINE POLYMER, AMMONIUM PHOSPHATE AND PHOSPHORITE

[75] Inventors: Roberto Pernice, Mestre; Michele Checchin, Preganziol; Alessandro Moro, Pianiga; Roberto Pippa, Noale, all of Italy

[73] Assignee: Enichem S.p.A., Milan, Italy

[21] Appl. No.: 489,730

[22] Filed: Jun. 13, 1995

[30] Foreign Application Priority Data

Jul. 6, 1994 [IT] Italy ................... MI94A1401

[51] Int. Cl.⁶ .................. C08K 5/29; C08K 3/32
[52] U.S. Cl. ............ 524/414; 524/100; 524/577; 524/582; 524/583; 524/584; 524/585; 524/586
[58] Field of Search .................. 524/414, 100, 524/577, 582, 583, 584, 585, 586

[56] References Cited

U.S. PATENT DOCUMENTS

| | | | |
|---|---|---|---|
| 4,504,610 | 3/1985 | Fontanelli et al. | 524/416 |
| 4,517,319 | 5/1985 | Reske et al. | 524/413 |
| 4,966,931 | 10/1990 | Akitaya et al. | 524/100 |
| 5,116,891 | 5/1992 | Eberspach et al. | 524/97 |
| 5,200,445 | 4/1993 | Cipolli et al. | 524/100 |

FOREIGN PATENT DOCUMENTS 0115871  8/1984  European Pat. Off. .

*Primary Examiner*—Robert E. Sellers
*Attorney, Agent, or Firm*—Oblon, Spivak, McClelland, Maier & Neustadt

[57] ABSTRACT

Reinforced, flame-resistant thermoplastic composition consisting of: (A) a polymeric matrix consisting of an olefinic or styrene (co)polymer; (B) a quantity which is sufficient to give flame resistance properties, of an intumescent flame-retarding agent consisting of a mixture of (i) a compound containing nitrogen, insoluble in water, consisting of an oligomer or polymer of a derivative of 1,3,5-triazine and (ii) an ammonium phosphate, and (C) from 5 to 50% by weight with respect to the total composition of a phosphorite having a phosphorous content, expressed as BPL (Bone Phosphate of Lime) of more than 40% by weight.

15 Claims, No Drawings

OLEFIN OR STYRENE (CO)POLYMER, TRAIZINE POLYMER, AMMONIUM PHOSPHATE AND PHOSPHORITE

The present invention relates to a reinforced, flame-resistant thermoplastic composition.

More specifically, the present invention relates to a reinforced thermoplastic composition with inorganic and flame-resistant fillers, based on olefinic or styrene polymers or copolymers, having excellent mechanical properties, a good processability and operating stability and without the formation of toxic combustion products.

Olefin and styrene polymers and copolymers are well-known in the art and are successfully used in the fields of packaging, road transport, for the production of household appliances, car parts, electronic articles and the like, owing to their excellent processability, chemical resistance, resistance to atmospheric agents, electrical properties and mechanical resistance.

In some of these applications it is necessary for the product to be moulded to have rigidity and/or shock-resistance properties which are higher than those of the starting polymer, and also to be flame-resistant.

To improve the rigidity properties, additives or fillers, for example glass fibres, kaolin, mica, oxides, carbonates of metals of the second or third group of the Periodic Table, etc., are normally incorporated into the polymeric matrix. The reinforced compositions generally tend to have a higher rigidity with respect to that of the simple starting polymer as well as an improved dimensional stability of the end-products.

In spite of these excellent properties, the compositions burn very easily and allow the flame to spread, and consequently their fields of application are greatly reduced.

In order to reduce or inhibit the flammability, it is customary to incorporate into the polymeric matrix certain additives generally known as flame-retarding, self-extinguishing or antiflame agents.

In the presence of these agents the combustion is retarded or even completely inhibited by various action mechanisms.

Several flame-retarding agents have been proposed in literature but these generally cause a more or less drastic reduction of the physico-mechanical properties, and stability and/or processability of the polymeric compositions.

For example, the Japanese patent publications 92855/1978, 29350/1979, 77658/1979, 26954/1981, 87462/1982 and 110738/1985 describe flame-resistant compositions based on polypropylene containing inorganic hydrate compounds as flame-resistant agents, such as for example, magnesium hydroxide, aluminium hydroxide, barium sulphate, antimonium oxide, hydrotalcite etc. These compositions require a great quantity of inorganic compound to obtain a satisfactory flame-resistance. As a result, the mouldability of the compositions is jeopardized and the end-products obtained by moulding have limited mechanical properties.

The halogenated derivatives of organic compounds, such as chloroparaffins, hexa-halo-benzenes, pentabromodiphenyl, pentabromodiphenyl-ether, decabromo-diphenyl-oxide or octabromodiphenyl, are also known and widely used as flame-resistant agents.

Also these halogenated derivatives however have their drawbacks; in fact, they develop toxic and/or corrosive substances during the processing and/or combustion, as described in CHEMOSPHERE—Vol. 15—No.5, pages 649–652, 1989 and Vol. 18—No. 1–6, pages 1235–1242, 1989.

In order to avoid the toxicity and/or corrosivity of the halogenated products, a proposal was made to use antiflame agents without halogens and capable of producing intumescence.

The intumescent-type compositions generally consist of the polymeric matrix and at least three main additives: one basically phosphorate, whose purpose is to activate the intumescence process by the formation of polyphosphoric acid; a second containing nitrogen which has a foaming action, and a third containing carbon which acts as carbon donor for the formation of an insulating cellular carbonaceous layer (char) between the polymer and flame.

Examples of intumescent antiflame agents comprise the following formulations: melamine, pentaerythrite and ammonium polyphosphate, described in U.S. Pat. No. 3,810,862; melamine cyanurate, a hydroxyalkyl derivative of isocyanuric acid and ammonium polyphosphate, described in U.S. Pat. No. 4,727,102; compounds of phosphorous and nitrogen, among which a combination of melamine phosphate, pentaerythrite and ammonium polyphosphate, described in WO-A-85/05626; an oligomeric or polymeric derivative of 1,3,5-triazine and ammonium polyphosphate, described in U.S. Pat. No. 4,504,610; pentate salts of amino-s-triazine, such as melammonium pentate and pentate salt of amelide, described in U.S. Pat. No. 4,201,705, etc.

These intumescent antiflame agents give the polymer which contains them, properties which cause the formation of a carbonaceous resin following fire or the application of a flame.

These intumescent antiflame agents have numerous advantages, such as for example, absence of corrosion in the operating equipment, low or complete absence of the emission of toxic fumes, as well as giving the polymeric matrix which contains them satisfactory antiflame properties.

These antiflame agents containing nitrogen and phosphorous can however have a conflicting reaction with the inorganic fillers which are generally used to reinforce the thermoplastic compositions, such as talc, calcium carbonate, kaolin, mica, etc.; and consequently these antiflame agents are no longer able to carry out their intumescent action as the inorganic fillers interfere with their action mechanism.

The Applicant has now found a particular inorganic filler which not only does not have a conflicting reaction with the antiflame agents containing nitrogen and phosphorous but also has a synergetic antiflame effect with these agents. This filler when added to olefin or styrene (co)polymers combined with an antiflame agent containing nitrogen and phosphorous gives the resulting compositions improved intumescent antiflame properties without negatively influencing their physico-mechanical properties and processability.

This particular filler is phosphorite, particularly that having a phosphorous content, expressed as a percentage of tricalcium phosphate or, in short, BPL (Bone Phosphate of Lime) of more than 40% by weight.

The present invention therefore relates to a reinforced, flame-resistant thermoplastic composition consisting of:

(A) a polymeric matrix consisting of an olefinic or styrene (co)polymer;

(B) a quantity which is sufficient to give antiflame properties of an intumescent antiflame agent consisting of a mixture of (i) a compound containing nitrogen, insoluble in water, consisting of an oligomer or a polymer of a derivative of 1,3,5-triazine and (ii) an ammonium phosphate, and (C) from 5 to 50% by weight with respect to the total composition of a phosphorite having a phosphorous content, expressed as a percentage of tricalcium phosphate or, in short, BPL (Bone Phosphate of Lime) of more than 40% by weight.

The weight ratio between the compound containing nitrogen (i) and ammonium phosphate (ii) in mixture (B) is between 1:1 and 1:4.

The oligomeric or polymeric product of the derivative of 1,3,5-triazine can have the general formula (I):

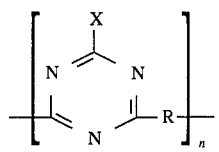

wherein:

X is a group having the formula:

or a heterocyclic group containing at least one nitrogen atom in the ring and bound to the triazinic ring by one of these nitrogen atoms, and $R_1$ is an alkyl radical containing from 1 to 20 carbon atoms or a cyclo-alkyl radical containing from 6 to 20 carbon atoms;

R is a bivalent radical of piperazine or an alkylenediamine bivalent radical containing from 2 to 6 carbon atoms, and n is an integer between 2 and 50, including extremes.

Examples of R radicals are: ethylenediamine, tetramethylenediamine, pentamethylenediamine, hexamethylenediamine, piperazine and alkyl-substituted piperazines.

Examples of heterocyclic groups defined as "X" comprise the radicals of morpholine, piperidine, piperazine, etc.

Examples of $R_1$ radicals comprise: methyl, ethyl, propyl, n-butyl, iso-butyl, hexyl, octyl, decyl, dodecyl, cyclohexyl, propyl-cyclohexyl, butyl-cyclohexyl, dodecylcyclohexyl etc.

Among the various known ammonium phosphates, those preferred in the composition of the present invention are ammonium polyphosphates corresponding to the formula $(NH_4PO_3)_p$ where p is higher than 2 and sufficiently high as to ensure a low solubility in water; p is preferably between 30 and 500.

An example of an ammonium polyphosphate is that which is known on the market under the trade-name Hostaflam® 422 or 462, produced and sold by Hoechst.

The mixture (B) of the oligomeric or polymeric product of a derivative of 1,3,5-triazine having formula (I) and an ammonium phosphate and its use as an antiflame agent of thermoplastic polymers is described in U.S. Pat. No. 4.504.610. This mixture is available on the market under the trade-name of SPINFLAM® MF 82/PE-1 or SPINFLAM® MF 82/PE-2, produced and sold by HIMONT S.p.A.

Phosphorites (C) are natural products of sedimentary and organogenic origin which contain apatites and many other impurities among which iron oxides, aluminium and magnesium phosphates, quartz etc.

The main reservoirs of phosphorites are situated in the United States, in ex-URSS, North Africa, such as Morocco, Tunisia, Algeria and Sahara, and in the Middle East, such as Jordan and Israel.

The phosphorous content in phosphorites preferably varies from between 60 and 85 BPL, equal to a content of phosphoric anhydride of between 27 and 40% by weight.

Particularly preferred is commercial phosphorite of the KHOURIBGA type coming from Morocco and having a content of phosphoric anhydride of 30–35%, equal to a BPL of 65–75.

The mixture of a compound containing nitrogen (i) and phosphorite (ii) is added in a quantity which is at least sufficient to give antiflame properties to the composition.

The quantity of this mixture is generally between 10 and 60% by weight with respect to the composition.

Examples of preferred compositions of the present invention comprise those containing:

from 80 to 40% by weight of an olefinic or styrene (co)polymer (A);

from 5 to 10% by weight of a compound containing nitrogen (i);

from 5 to 20% by weight of an ammonium phosphate (ii), and from 10 to 50% by weight of a phosphorite (C); the sum of these components being equal to 100% by weight.

The term "styrene (co)polymers", as used in the present invention and claims, refers to any solid, thermoplastic polymer, and relative copolymer, consisting either entirely or mostly, i.e. containing 50% by weight chemically bound, of one or more styrene or vinylaromatic monomers having the general formula:

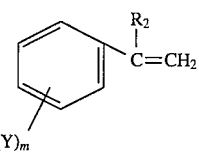

wherein:

$R_2$ represents hydrogen or an alkyl radical having from 1 to 4 carbon atoms;

m is zero or an integer between 1 and 5, and

Y represents a halogen or an alkyl radical having from 1 to 4 carbon atoms.

Examples of styrene or vinylaromatic compounds having the above general formula are: styrene; methyl-styrene; mono-, di-, tri-, tetra- and penta-chlorostyrene and the corresponding alpha-methyl-styrenes; styrenes alkylated in the nucleus and the corresponding alpha-methyl-styrenes such as ortho and para-methyl-styrenes, ortho and para-ethyl-styrenes; ortho- and para-methyl-alpha-methyl-styrenes, etc.

These monomers can be used either alone or mixed with each other or with other ethylenically unsaturated copolymerizable co-monomers such as, for example, maleic anhydride, acrylonitrile, methacrylonitrile, $C_1$–$C_4$ alkyl esters of acrylic or methacrylic acid etc., in a quantity of up to 50% by weight.

The styrene (co)polymers have a weight average molecular weight of between 100,000 and 1,000,000.

The term styrene (co)polymers also comprises the above polymers and copolymers modified with rubber to make them shock-resistant.

The term "olefin (co) polymer" as used in the present invention and claims, refers to all olefin homopolymers and/or copolymers obtained from ethylenically unsaturated monomers, with a linear or branched chain, containing from 2 to 6 carbon atoms.

Examples of olefin (co)polymers comprise: polyethylene, polypropylene and/or an ethylene-propylene copolymer having a prevalent content of ethylene, such as for example a copolymer consisting of from 75 to 98% by weight of ethylene and from 25 to 2% by weight of propylene.

Polybutene and polypentene can also be used, preferably mixed with polyethylene and/or polypropylene.

The term "polyethylene" comprises any (co)polymer of ethylene having a density within the range of 0.85 and 0.97 g/cm³ and a "Melt Flow Index" of less than 15 g/10 min. and preferably between 2 and 8 g/10 min., measured according to ASTM D 1238, at 190° C. and at 2.16 Kg.

Preferred polyolefins in the composition of the present invention are those known as low density polyethylene (LDPE), linear low density polyethylene (LLDPE) and high density polyethylene (HDPE). These polyolefins are known on the market, for example, under the trade-name ESCORENE® LL 1201 and LL 6101 (LLDPE) of EXXON; RIBLENE® AK 1912 (LDPE) of ENICHEM; ERACLENE® HUG 5031 (HDPE), MM 95 (LDPE) and ML 75 (LDPE) of ENICHEM.

The compositions of the present invention can also additionally contain other additives such as glass fibres, carbon fibres, organic and inorganic fibres with a high modulus, metallic fibres, as well as dyes, pigments, stabilizers, lubricants, etc., which are well known to experts in the field.

Suitable stabilizers which can be used in the compositions of the present invention comprise many of the known thermo-oxidation stabilizers which are suitable and generally used for polyolefin resins or for styrene polymers. For example, sterically hindered phosphites and phenols can be added to the compositions of the present invention, in a quantity which can vary from 0.05 to 5% by weight.

The compositions of the present invention can be prepared with any of the conventional mixing methods. For example, the mixing can be carried out in the molten state and the time and temperature are selected and determined on the basis of the composition. The temperatures are generally between 150 and 250° C.

Any mixing unit can be used. The method can be continuous or batch. In particular, mono- or twin-screw extruders, internal mixers of the Banbury type, BRABENDER plastographs, mixing rolls and the like can be used.

The compositions of the present invention can also be made expansible by the incorporation of an expanding agent such as a hydrocarbon with a low boiling point (pentane), according to the known techniques.

They can be easily processed by injection or extrusion and have a combination of properties which make them suitable to be used for the preparation of articles having good mechanical and excellent inflammability characteristics.

The following examples, which are illustrative but in no way restricting, provide a better understanding of the present invention and enable its embodiment.

In the examples, all the parts and percentages are given by weight unless otherwise specified.

In the examples, the following methods were used for measuring the characteristics of the composition.

FLAME RESISTANCE

The flame-resistance of the compositions was determined either by measuring the oxygen index (LOI) following the procedure of ASTM D 2638, on samples having dimensions of 127×6.5×3.2 mm; or by the "Underwriter's Laboratory" vertical method called UL 94 V described in "Standard For Tests For Flammability of Plastic Materials For Parts in Devices and Appliances" 3° Edition, Jan. 28, 1980, on samples having dimensions of 127×12.7×3.2 mm.

Mechanical Properties

The IZOD resiliences with notch were determined at +23° C., according to ASTM D256, on samples having a thickness of 3.2 mm; the ultimate elongation and flexural modulus according to the procedure of ASTM D790.

Thermal properties

The flexural temperature (HDT) under a load of 0.455 MPas, was measured according to ASTM D648 together with the VICAT in oil at 5 Kg according to ASTM D1525.

Rheological properties

The Melt Flow Index (M.F.I.) was measured according to ASTM D1238, at 190° C. and 2.16 Kg.

EXAMPLES 1–4

A mixture, prepared at room temperature, consisting of:

low density polyethylene (LDPE) having a Melt Flow Index of 2.8 g/10 min., produced and sold by ENICHEM under the trade-name of ERACLENE® ML 75, in the quantity shown in Table I in weight percentage;

a mixture of ammonium polyphosphate and poly(triazinylpiperazine), in the weight ratio of about 2–3:1, known on the market under the trade name SPINFLAM MF 82/PE-2 of HIMONT, in the quantity shown in Table I in weight percentage;

KHOURIBGA phosphite, in the quantities shown in Table I in weight percentage;

calcium carbonate, known on the market under the trade-name CALCITEC® M 2, produced and sold by Mineraria Sacilese, in the quantities shown in Table I in weight percentage, was charged into a HAAKE plastograph, equipped with a 50 ml cell and heated to a temperature of 150° C.

The mixtures thus obtained were ground, compression moulded at 160° C. and characterized.

The characteristics of the mixtures obtained are shown in Table I below.

TABLE I

| COMPONENTS | 1* | 2* | 3 | 4 |
|---|---|---|---|---|
| -ERACLENE | 70 | 50 | 50 | 60 |
| -SPINFLAM | 30 | 30 | 30 | 30 |
| -CALCITEC | — | 20 | — | — |
| -PHOSPHORITE | — | — | 20 | 10 |
| FLAME RESISTANCE | | | | |
| -UL 94 V | VO | n.c. | VO | VO |
| -LOI | 36 | 22.8 | 33 | 31 |
| MECHANICAL PROPERTIES | | | | |
| -IZOD (J/m) | 32 | 30 | 30 | 29 |
| -Flexural modulus (MPa) | 1900 | 1600 | 2400 | 2100 |
| THERMAL PROPERTIES | | | | |
| -HDT (°C.) | 97 | 103 | 115 | 113 |
| -VICAT (°C.) | 69 | 72 | 80 | 78 |
| RHEOLOGICAL PROPERTIES | | | | |
| -M.F.I. (g/10 min.) | 2.4 | 1.5 | 1.4 | 1.8 |

*Comparative examples.

EXAMPLE 5

A mixture, prepared at room temperature, of:

40% by weight of crystal polystyrene (A) having a molecular weight of about 130,000, produced and sold by the Applicant under the trade-name KOSTIL®;

30% by weight of SPINFLAM® MF 82/PE-2 of example 1, and

30% of phosphorite, was fed into a BRABENDER plastograph, equipped with a 50 ml cell and heated to 170° C.

The mastication rate of the BRABENDER® was 80 revs/minute for a time of 5 minutes.

The mixture thus obtained was ground in a mill and compression moulded with a CARVER press at 180° C.
The characteristics of the mixture were:

| -UL 94 V | VO; |
|---|---|
| -LOI | 26; |
| -HDT | 96° C.; |
| -VICAT | 99° C. |

We claim:
1. Reinforced, flame-resistant thermoplastic composition consisting of:
  (A) a polymeric matrix consisting of an olefin or styrene (co)polymer;
  (B) a quantity which is sufficient to give antiflame properties of an intumescent antiflame agent consisting of a mixture of an oligomer or a polymer of a derivative of 1,3,5-triazine and (ii) an ammonium phosphate, and
  (C) from 5 to 50% by weight with respect to the total composition of a phosphorite having a phosphorous content, expressed as BPL (Bone Phosphate of Lime), of more than 40% by weight.

2. Thermoplastic composition according to claim 1, wherein the weight ratio between the oligomer or polymer of a derivative of 1,3,5-triazine (i) and the ammonium phosphate (ii) in mixture (B) is between 1:1 and 1:4.

3. Thermoplastic composition according to claims 1 or 2, wherein the oligomer or polymer product of a derivative of 1,3,5-triazine has the general formula (I):

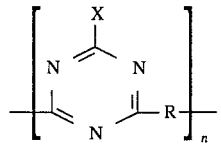

wherein:

X is a group having the formula:

 (II)

or a heterocyclic group containing at least one nitrogen atom in the ring and bound to the triazinic ring by one of these nitrogen atoms, and $R_1$ is an alkyl radical containing from 1 to 20 carbon atoms or a cyclo-alkyl radical containing from 6 to 20 carbon atoms;

R is a bivalent radical of piperazine, alkyl-substituted piperazine or an alkylenediamine bivalent radical containing from 2 to 6 carbon atoms, and n is an integer between 2 and 50.

4. Thermoplastic composition according to claim 3, wherein R is selected from the group consisting of ethylenediamine, tetramethylenediamine, pentamethylenediamine, hexamethylenediamine, piperazine and alkyl-substituted piperazines; X is selected from the group consisting of the radicals of morpholine, piperidine, and piperazine, and $R_1$ is selected from the group consisting of methyl, ethyl, propyl, n-butyl, iso-butyl, hexyl, octyl, decyl, dodecyl, cyclohexyl, propyl-cyclohexyl, butyl-cyclohexyl, and dodecylcyclohexyl.

5. Thermoplastic composition according to claim 1, wherein the ammonium phosphate is an ammonium polyphosphate having the formula $(NH_4PO_3)$ with p higher than 2 and sufficiently high as to ensure a low solubility in water.

6. Thermoplastic composition according to claim 5, wherein the value of p is between 30 and 500.

7. Thermoplastic composition according to claim 1 wherein the phosphorites have a phosphorous content of between 60° and 85° by weight equal to a content of phosphoric anhydride of between 27 and 40% by weight.

8. Thermoplastic composition according to claim 1 wherein the quantity of mixture (B) of an oligomer or polymer of a derivative of 1,3,5-triazine and an ammonium phosphate is between 10 and 60% by weight with respect to the total composition.

9. Thermoplastic composition according to claim 1 comprising:
  from 80 to 40% by weight of an olefinic or styrene (co)polymer (A);
  from 5 to 10% by weight of an oligomer or polymer of a derivative of 1,3,5-triazine;
  from 5 to 20% by weight of an ammonium phosphate (ii), and
  from 10 to 50% by weight of a phosphorite (C); the sum of these components being equal to 100% by weight.

10. Thermoplastic composition according to claim 1 wherein the styrene (co)polymer contains, chemically bound, at least 50% by weight of one or more styrene or vinylaromatic monomers having the general formula:

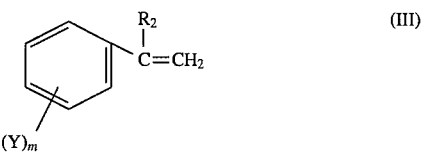

wherein:

$R_2$ represents hydrogen or an alkyl radical having from 1 to 4 carbon atoms;

m is zero or an integer between 1 and 5, and

Y represents a halogen or alkyl radical having from 1 to 4 carbon atoms.

11. Thermoplastic composition according to claim 1 wherein the olefinic (co)polymer is obtained from ethylenically unsaturated monomers, with a linear or branched chain, containing from 2 to 6 carbon atoms.

12. Thermoplastic composition according to claim 11, wherein the olefinic (co)polymer is selected from the group consisting of polyethylene, polypropylene, an ethylenepropylene, and mixtures thereof copolymer having from 75 to 98% by weight of ethylene and from 25 and 2% by weight of propylene.

13. Thermoplastic composition according to claim 12, wherein the olefinic (co)polymer is polyethylene having a density of between 0.85 and 0.97 g/cm³, preferably between 0,915 and 0,960 g/cm³, and a Melt Flow Index of less than 15 and preferably of between 2 and 8 g/10 min, measured according to ASTM D 1238, at 190° C. and at 2.16 Kg.

14. Thermoplastic composition according to claim 13, wherein the olefinic (co)polymer is linear low density polyethylene.

15. Thermoplastic composition according to claim 1 additionally containing other additives selected from the group consisting of glass fibres, carbon fibres, organic and inorganic fibres other than glass and carbon fibres with a high modulus, metallic fibres, dyes, pigments, stabilizers and lubricants.

* * * * *